(12) United States Patent
Shrivastava et al.

(10) Patent No.: US 12,739,730 B2
(45) Date of Patent: Sep. 15, 2026

(54) HANDLING OF SYSTEM INFORMATION IN SIDELINK RELAY

(71) Applicant: Nokia Technologies Oy, Espoo (FI)

(72) Inventors: Rudraksh Shrivastava, Stuttgart (DE); Jakob Lindbjerg Buthler, Aalborg (DK); Berthold Panzner, Munich (DE); György Tamás Wolfner, Budapest (HU)

(73) Assignee: Nokia Technologies Oy, Espoo (FI)

(*) Notice: Subject to any disclaimer, the term of this patent is extended or adjusted under 35 U.S.C. 154(b) by 355 days.

(21) Appl. No.: 18/552,752

(22) PCT Filed: Mar. 31, 2021

(86) PCT No.: PCT/EP2021/058461
§ 371 (c)(1),
(2) Date: Sep. 27, 2023

(87) PCT Pub. No.: WO2022/207096
PCT Pub. Date: Oct. 6, 2022

(65) Prior Publication Data

US 2024/0373320 A1 Nov. 7, 2024

(51) Int. Cl.

| | |
|---|---|
| ***H04W 40/22*** | (2009.01) |
| ***H04L 47/11*** | (2022.01) |
| ***H04W 4/40*** | (2018.01) |
| ***H04W 24/08*** | (2009.01) |
| ***H04W 40/24*** | (2009.01) |

(Continued)

(52) U.S. Cl.
CPC ............. *H04W 40/22* (2013.01); *H04L 47/11* (2013.01); *H04W 24/08* (2013.01); *H04W 40/24* (2013.01); *H04W 48/16* (2013.01); *H04W 48/20* (2013.01); *H04W 4/40* (2018.02); *H04W 88/04* (2013.01)

(58) Field of Classification Search
None
See application file for complete search history.

(56) References Cited

U.S. PATENT DOCUMENTS

2020/0169941 A1 5/2020 Chen
2022/0232469 A1* 7/2022 Phuyal ................ H04W 68/005
(Continued)

FOREIGN PATENT DOCUMENTS

WO 2019/216717 A1 11/2019
WO WO-2021204232 A1 * 10/2021 ...... H04W 36/00837

OTHER PUBLICATIONS

U.S. Appl. No. 63/136,463, filed Jan. 12, 2021 (Year: 2021).*
(Continued)

*Primary Examiner* — Jay L Vogel
(74) *Attorney, Agent, or Firm* — McCarter & English, LLP

(57) ABSTRACT

It is provided a method comprising: monitoring if a remote terminal receives a first system information block from a first cell via a first path and a second system information block from a second cell via a second path different from the first path; comparing a content of the first system information block with a content of the second system information block if the remote terminal receives the first system information block and the second system information block; selecting one of the first path and the second path based on a result of the comparing; causing the remote terminal to connect via the selected one of the first path and the second path.

8 Claims, 8 Drawing Sheets

(51) Int. Cl.

| | |
|---|---|
| ***H04W 48/16*** | (2009.01) |
| ***H04W 48/20*** | (2009.01) |
| ***H04W 88/04*** | (2009.01) |

(56) References Cited

U.S. PATENT DOCUMENTS

| | | | | |
|---|---|---|---|---|
| 2023/0180313 | A1* | 6/2023 | Freda .................... | H04W 76/14 370/310 |
| 2023/0336962 | A1* | 10/2023 | Chang .................. | H04W 48/20 |

OTHER PUBLICATIONS

U.S. Appl. No. 63/104,390, filed Oct. 22, 2020 (Year: 2020).*

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

"Revised SID: Study on NR sidelink relay", 3GPP TSG RAN Meeting #90e, RP-202208, Agenda: 9.7.7, OPPO, Dec. 7-11, 2020, pp. 1-5.

"Summary document for AI 8.7.2.1", 3GPP TSG-RAN WG2 Meeting #113e, R2-2102091, Agenda: 8.7.2.1, InterDigital, Jan. 25-Feb. 5, 2021, pp. 1-10.

"Summary of [AT113-e][605][Relay] Continuation of L2 architecture issues (InterDigital)", 3GPP TSG-RAN WG2 Meeting #113e, R2-2102110, Agenda: 8.7.2.1, InterDigital, Jan. 25-Feb. 5, 2021, pp. 1-30.

"3rd Generation Partnership Project; Technical Specification Group Radio Access Network; LTE Positioning Protocol (LPP) (Release 16)", 3GPP TS 37.355 V16.3.0, Dec. 2020, pp. 1-298.

"Report from session on positioning and sidelink relay", 3GPP TSG-RAN WG2 Meeting #113-e, R2-21xxxxx, MediaTek, Jan. 25-Feb. 5, 2021, pp. 1-43.

International Search Report and Written Opinion received for corresponding Patent Cooperation Treaty Application No. PCT/EP2021/058461, dated Dec. 14, 2021, 12 pages.

"Discussion on the system information delivery", 3GPP TSG RAN WG2 #98, R2-1704637, Agenda: 9.1.2.2, ZTE, May 15-19, 2017, 4 pages.

"SIB Handling in Sidelink UE-to-Nwk Relay", 3GPP TSG-RAN WG2 Meeting #113bis Electronic, R2-2103482, Agenda: 8.7.4.1, Nokia, Apr. 12-20, 2021, 5 pages.

Office action received for corresponding European Patent Application No. 21716361.7, dated May 7, 2025, 5 pages.

* cited by examiner

S410

Cause cell to provide prioritization decision for paths

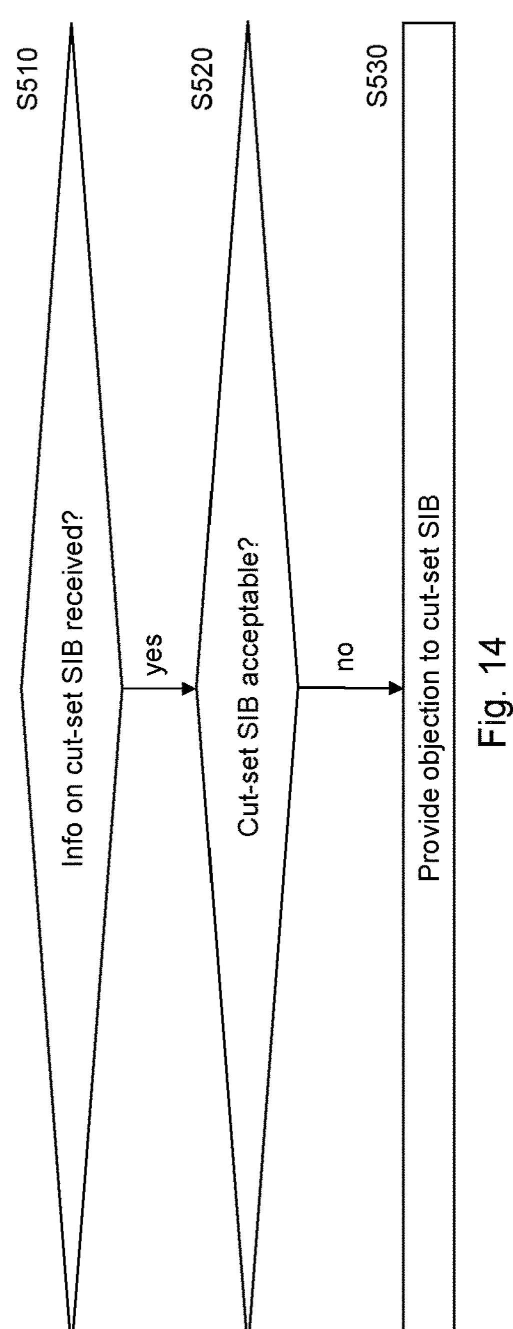
Fig. 14
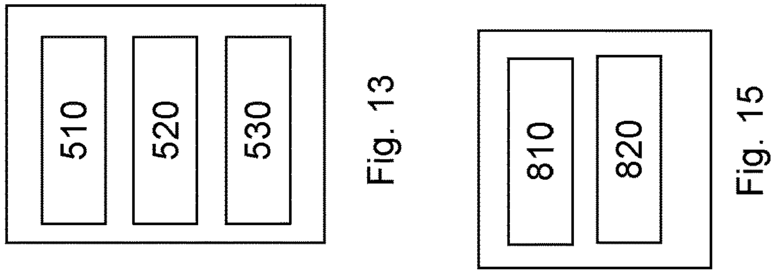
Fig. 13
Fig. 15

HANDLING OF SYSTEM INFORMATION IN SIDELINK RELAY

RELATED APPLICATION

This application claims priority to PCT Patent Application No. PCT/EP2021/058461, filed Mar. 31, 2021, and entitled "Handling of system information in sidelink relay", which is incorporated herein by reference in its entirety.

FIELD OF THE INVENTION

The present disclosure relates to sidelink relay, in particular to handling of system information in sidelink relay, e.g. NR sidelink relay.

ABBREVIATIONS

3GPP 3$^{rd}$ Generation Partnership Project
4G/5G/6G 4$^{th}$/5$^{th}$/6$^{th}$ Generation
CBR Channel Busy Ratio
CE Control Element
DCI Downlink Control Indicator
DL Downlink
eNB evolved NodeB
gNB next generation NodeB
IC In Coverage
ID Identifier
L1/L2/L3 Layer 1 (PHY)/Layer 2 (MAC)/Layer 3
MAC Medium Access Control
MIB Master Information Block
NPN Non-Public Network
NR New Radio
NW Network
PLMN Public Land Mobile Network
OOC Out of Coverage
OTA Over-the Air
PDSCH Physical Downlink Shared Channel
PHY Physical (layer)
PNI-NPN Public Network Integrated-NPN
QoS Quality of Service
RAN Radio Access Network
RAT Radio Access Technology
RLC Radio Link Control
RRC Radio Resource Control
SCH Shared Channel
SI System Information
SIB1 System Information Block 1
SIBx System Information Block x (x integer larger than 1)
SL Sidelink
SNPN Stand-alone NPN
TR Technical Report
TS Technical Specification
UE User Equipment
WI Work Item

GLOSSARY

For NR, the following applies. Specifics (such as the transmission period and the respective channel) may differ for different RATs:

- IC/OOC: A remote UE may be in coverage (IC) by the network (via Uu interface), or out of coverage by the network (via Uu interface), if connected only to the relay UE via PC5 interface;
- MIB: PBCH and Master Information Block Cell search is the procedure for a UE to acquire time and frequency synchronization with a cell and to detect Physical layer Cell ID (PCI) of the cell. MIB is transmitted on BCH every 80 ms;
- PC5 interface: radio interface between a relay UE and a remote UE;
- SI contains pointers to all available SIBs in the cell;
- SIB1 contains basic information on the cell that UE may use to decide whether or not the UE may access the cell. In addition, SIB1 may define scheduling of other SIBs. SIB1 is broadcasted, typically every 160 ms;
- SIBx contains further configuration data for various purposes.
- Uu interface: radio interface between a base station (cell) and a UE

BACKGROUND

System Information Generally:

According to 3GPP TS 38.331, SIB1 includes information regarding the availability and scheduling (e.g. mapping of SIBs to SI message, periodicity, SI-window size) of other SIBs with an indication whether one or more SIBs are only provided on-demand and, in that case, the configuration needed by the UE to perform a respective SI request. SIB1 is a cell-specific SIB.

For example, the following is specified for SIB1 in NR (i.e. 5G Radio):

- Broadcasted with the periodicity/in a periodic manner and within the periodic time, the repetitive transmissions may happen
- Includes information regarding the availability and scheduling (e.g. periodicity, SI-window size) of other SIB(s)
- Indicates whether they (i.e. other SIB(s)) are provided via periodic broadcast basis or only on-demand basis
- (If other SIB(s) are provided on-demand then SIB1) Includes information for the UE to perform SI request When the UE acquires a MIB or a SIB1 or an SI message in a serving cell as described in 3GPP TS 38.331, clause 5.2.2.3, and if the UE stores the acquired SIB, then the UE shall store

- the associated areaScope, if present,
- the first PLMN-Identity in the PLMN-IdentityInfoList for non-NPN-only cells or
- the first NPN identity (SNPN identity in case of SNPN, or PNI-NPN identity in case of PNI-NPN) in the NPN-IdentityInfoList for NPN-only cells,
- the cellIdentity, the systemInformationAreaID, if present, and
- the valueTag, if present, as indicated in the si-SchedulingInfo for the SIB.
- If the UE stores the acquired posSIB, then the UE shall store the associated areaScope, if present, the cellIdentity, the systemInformationAreaID, if present, the valueTag, if provided in assistanceDataSIB-Element, and the expirationTime if provided in assistanceDataSIB-Element.
- The UE may use a valid stored version of the SI except MIB, SIB1, SIB6, SIB7 or SIB8 e.g. after cell re-selection, upon return from out of coverage or after the reception of SI change indication. The valueTag and expirationTime for posSIB is optionally provided in assistanceDataSIB-Element, as specified in 3GPP TS 37.355

NR Sidelink Relay (3GPP RP-202208) is specified in RAN2 in 3GPP Release 17. Accordingly, a relay UE may provide a link (PC5 interface) to a remote UE such that the remote UE may connect to the network via the relay UE. The relay UE itself may be connected directly to the network, or via another relay UE such that the (first) relay UE is a remote UE towards the (second) relay UE. In addition, the remote UE may or may not be connected directly to the network (via Uu interface).

In the latest RAN2 meetings, the following agreements were met:

- On demand SI request is supported via a relay UE for OOC remote UE.
- DedicatedSIBRequest procedure is re-used for the remote UE in RRC_CONNECTED to request SI via the relay UE.
- For remote UE in RRC_IDLE/INACTIVE, how on-demand SI procedure differs from legacy can be left to normative work.
- A remote UE (IC or OOC) can request/receive SI via the relay UE when it is PC5-RRC connected to a remote UE. Reception of SI via Uu for IC remote UE can be discussed in WI phase.

SUMMARY

It is an object of the present invention to improve the prior art.

According to a first aspect of the invention, there is provided an apparatus comprising: one or more processors, and memory storing instructions that, when executed by the one or more processors, cause the apparatus to perform: monitoring if a remote terminal receives a first system information block from a first cell via a first path and a second system information block from a second cell via a second path different from the first path; comparing a content of the first system information block with a content of the second system information block if the remote terminal receives the first system information block and the second system information block; selecting one of the first path and the second path based on a result of the comparing; causing the remote terminal to connect via the selected one of the first path and the second path.

According to a second aspect of the invention, there is provided an apparatus comprising: one or more processors, and memory storing instructions that, when executed by the one or more processors, cause the apparatus to perform: monitoring if a remote terminal receives a first system information block via a first path, a second system information block via a second path different from the first path, and a prioritization decision between the first path and the second path; selecting one of the first path and the second path based on the prioritization decision if the remote terminal receives the first system information block, the second system information block and the prioritization decision; causing the remote terminal to connect via the selected one of the first path and the second path, wherein the prioritization decision indicates which of the first path and the second path is prioritized.

According to a third aspect of the invention, there is provided an apparatus comprising: one or more processors, and memory storing instructions that, when executed by the one or more processors, cause the apparatus to perform: monitoring if a remote terminal receives a first system information block via a first path from a first cell and a second system information block via a second path from a second cell; comparing a content of the first system information block with a content of the second system information block if the remote terminal receives the first system information block and the second system information block; generating a third system information block as a cut-set of the first system information block and the second system information block; causing the remote terminal to connect via one of the first path and the second path and to operate according to the third system information block; wherein the second path is different from the first path.

According to a fourth aspect of the invention, there is provided an apparatus comprising: one or more processors, and memory storing instructions that, when executed by the one or more processors, cause the apparatus to perform: causing a first cell to provide a prioritization decision for a selection between a first path and a second path by a remote terminal, wherein the first path is from the first cell to the remote terminal; the second path is from a second cell to the remote terminal; the second path is different from the first path; and the prioritization decision indicates which of the first path and the second path is prioritized for the selection by the remote terminal.

According to a fifth aspect of the invention, there is provided an apparatus comprising: one or more processors, and memory storing instructions that, when executed by the one or more processors, cause the apparatus to perform: monitoring if a cell receives an information of a cut-set system information block from a remote terminal; checking, if the cell receives the information, whether or not it is acceptable for the cell that the remote terminal operates based on the cut-set system information block; causing the cell to provide, to the remote terminal, an objection to the cut-set system information block if it is not acceptable for the cell that the remote terminal operates based on the cut-set system information block, wherein a content of the cut-set system information block is a subset of the content of a system information block transmitted by the cell.

According to a sixth aspect of the invention, there is provided a method comprising: monitoring if a remote terminal receives a first system information block from a first cell via a first path and a second system information block from a second cell via a second path different from the first path; comparing a content of the first system information block with a content of the second system information block if the remote terminal receives the first system information block and the second system information block; selecting one of the first path and the second path based on a result of the comparing; causing the remote terminal to connect via the selected one of the first path and the second path.

According to a seventh aspect of the invention, there is provided a method comprising: monitoring if a remote terminal receives a first system information block via a first path, a second system information block via a second path different from the first path, and a prioritization decision between the first path and the second path; selecting one of the first path and the second path based on the prioritization decision if the remote terminal receives the first system information block, the second system information block and the prioritization decision; causing the remote terminal to connect via the selected one of the first path and the second path, wherein the prioritization decision indicates which of the first path and the second path is prioritized.

According to an eighth aspect of the invention, there is provided a method comprising: monitoring if a remote terminal receives a first system information block via a first path from a first cell and a second system information block via a second path from a second cell; comparing a content of the first system information block with a content of the second system information block if the remote terminal receives the first system information block and the second system information block; generating a third system information block as a cut-set of the first system information block and the second system information block; causing the remote terminal to connect via one of the first path and the second path and to operate according to the third system information block; wherein the second path is different from the first path.

According to a ninth aspect of the invention, there is provided a method comprising causing a first cell to provide a prioritization decision for a selection between a first path and a second path by a remote terminal, wherein the first path is from the first cell to the remote terminal; the second path is from a second cell to the remote terminal; the second path is different from the first path; and the prioritization decision indicates which of the first path and the second path is prioritized for the selection by the remote terminal.

According to a tenth aspect of the invention, there is provided a method comprising: monitoring if a cell receives an information of a cut-set system information block from a remote terminal; checking, if the cell receives the information, whether or not it is acceptable for the cell that the remote terminal operates based on the cut-set system information block; causing the cell to provide, to the remote terminal, an objection to the cut-set system information block if it is not acceptable for the cell that the remote terminal operates based on the cut-set system information block, wherein a content of the cut-set system information block is a subset of the content of a system information block transmitted by the cell.

Each of the methods of the sixth to tenth aspects may be a method of relaying.

According to an eleventh aspect of the invention, there is provided a computer program product comprising a set of instructions which, when executed on an apparatus, is configured to cause the apparatus to carry out the method according to any of the sixth to tenth aspects. The computer program product may be embodied as a computer-readable medium or directly loadable into a computer.

According to some embodiments of the invention, at least one of the following advantages may be achieved:

- UE may receive SI via different paths and employ it for selection of its path to the network;
- UE may choose a suitable network link/path [Uu and/or PC5] for its connection to the network;
- Network may support the selection.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 11 shows an apparatus according to an example embodiment of the invention;

FIG. 12 shows a method according to an example embodiment of the invention;

FIG. 13 shows an apparatus according to an example embodiment of the invention;

FIG. 14 shows a method according to an example embodiment of the invention; and FIG. 15 shows an apparatus according to an example embodiment of the invention.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

From the above summary of the latest RAN2 meeting, in particular the last bullet thereof, it is clear that it may be relevant to allow the remote UE to obtain the SI directly from the network (i.e. via the Uu interface) or via the relay UE (i.e. via PC5 interface) from the network. Obtaining the SI from Uu interface may be possible in a case such as that the condition of the Uu interface for the remote UE is fluctuating and may not be good enough to provide services over the Uu interface to the remote UE, or in a case such as that PC5 interface is overloaded or suffers congestion.

Figure 1:
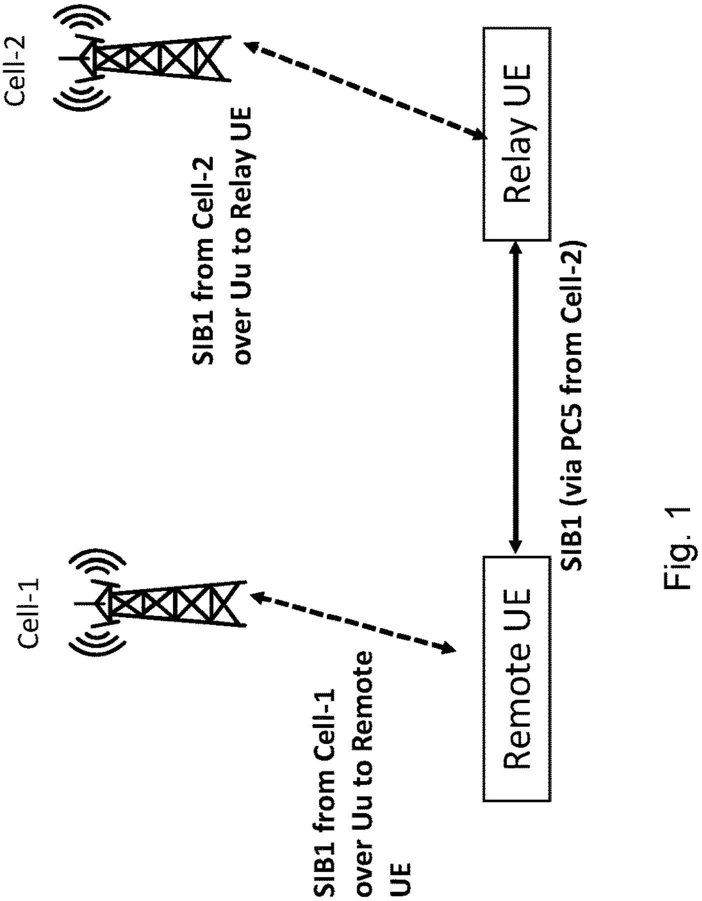
FIG. 1 shows an inter-cell scenario.

Generally, it may be helpful for the entire system to be able to receive SI via different paths, as:

- Limiting to receive SI for Remote UE via only Relay UE may not be the future proof as a remote UE may have several hops before it reaches the final Relay UE that connects it to the network.
  - In a multi-hop case, it is open how multiple UE-to-UE relays and UE-to-NW relays handle SI. The SI for the remote UE may not rely on SI from a single gNB to which the Relay UE is connected.
- If the Uu connection is strong enough to provide SI to the remote UE, then the transmission of SI over PC5 will cause potentially unnecessary load to the PC5 interface (or vice versa)
- Transmission of SI over PC5 will cause potential unnecessary load to the relay UE which has to request and forward multiple system information blocks (or vice versa)
- It can also be difficult to design a system where multiple Remote UEs receiving SIs via their respective Uu interfaces from different gNBs while being connected to a single Relay UE and from there to a single serving gNB.

the remote UE may request one or more on-demand SIBs via different paths (direct and indirect) from the network However, allowing the UE to receive SI from both relay UE as well as via Uu interface will spur the need for a method to handle different SIs within a remote UE, as the information may be different. Based on the FIG. 1 for a remote UE that may connect to a network via a relay UE in a NR sidelink L2 UE-Network-relay scenario to two different cells (intercell scenario), the following problems exist:

In case the remote-UE is camped on cell 1 and the relay-UE is camped on cell 2:

The remote UE and the relay UE may have different PLMNs and/or cells

The SI and SIBs of the gNB-1 and gNB-2 may differ i.e. parameters in SI/SIBs may be different. Hence, remote UE does not know the parameters of which SI/SIB to apply.

the cell of the relay UE may not provide all requested SIBs (e.g. if the cell 2 of the relay UE does not support certain features supported by the cell 1) (or vice versa)

Figure 2:
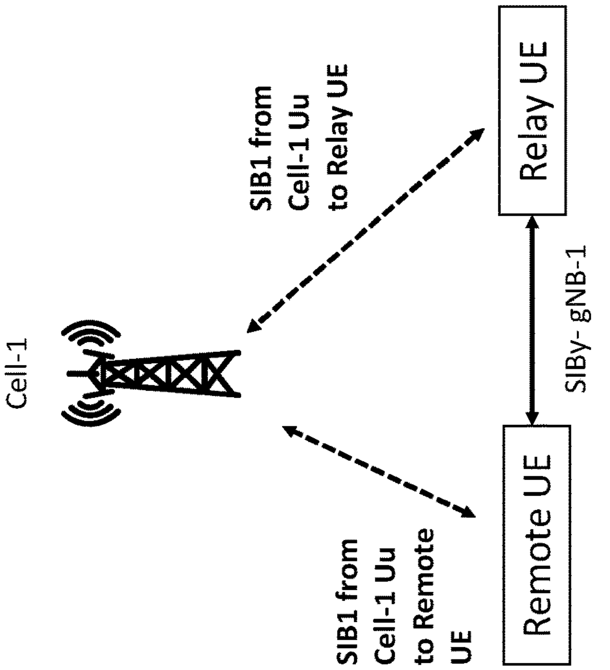
FIG. 2 shows an intra-cell scenario.

As another option, remote UE and relay UE may camp in the same cell (see FIG. 2). In this case, the remote UE may receive/decode SI over Uu interface but may not be capable to receive/decode userplane data over Uu interface, e.g. because of high load on this interface. In this case, UE may request control information over Uu interface and may request user plane information over PC5 via the Relay UE (or vice versa).

Some example embodiments of this invention provide a solution for a case that a remote UE receives SIBs from multiple paths (Uu and PC5) and/or cells. For example, the remote UE may receive different SIBs over Uu and PC5 respectively in an inter-cell scenario (that may cause a conflict within the remote UE in deciding which SIB to follow). Furthermore, the remote UE may need to prioritize one of the paths in an intra-cell or inter-cell scenario. The mechanisms according to some example embodiments of the invention ensure a seamless UE operation and an appropriate path selection/prioritization for receiving and following the SIBs (operating according to the SIB). For the request of SIBs in an on-demand manner, the remote-UE may follow the mechanism defined for the reception of SIBs.

In particular, some example embodiments of the invention specify the behaviour of the UE (in particular: of a remote UE) on handling SIBs received via 2 different paths (i.e. over Uu interface and PC5 interface via Relay UE respectively). The remote UE may meet a decision on which SIB to select and follow when it receives SIBs from separate paths, e.g. over Uu directly from the network and over PC5 via the Relay UE.

Both intra-cell and the inter-cell case are covered. In the inter-cell cell case, the SIBs received by a remote UE over two separate paths (i.e. via Uu interface and PC5 interface) may or may not be the same. In some example embodiments, the remote UE compares the contents of the SIBs and select the most appropriate SIB for its functioning. In some example embodiments, the cells may indicate the (de-) prioritization of their corresponding SIBs to the remote UE. As another option, the remote UE may initiate an on-demand cell coordination procedure to select a suitable SIB for its operation. Some example embodiments provide new information elements within the SIB that can be configured by the network and assist a remote UE in selecting a suitable received SIB. In some example embodiments, UE has a predefined prioritization of one of the paths.

Some example embodiments of the invention may relate to one or both of the following two scenarios:

Direct to Indirect Path Switch:

The UE most recently obtained SI is coming from a Uu connection because the most recent/current connection has been via the Uu interface. Upon a change of Uu signal quality (for example), the UE1 decides to establish a relay connection as to obtain data from relay, thus becoming a remote UE. Another reason for such a transition, the UE1 may join a special group of UEs, which communicates through a relay, e.g. as to save power. Thus, UE receives a new SIB over the relay interface PC5.

Indirect to Direct Path Switch:

The UE is a remote UE and, thus, the UE's (most recently obtained SI is coming from a relay UE. However, the scenario has changed (e.g. Uu signal quality has improved, UE leaves special group), and the connection should now go through Uu interface. Thus, UE receives a new SIB over Uu interface.

Solution-1:

In the first solution, it is assumed that the state of the UE is mid-transition (i.e., in the middle of one of the path switches outlined above), and that the UE has the stored SIBs from Uu interface and from relay interface (PC5 interface) (the old one and the newly received one). In detail, the remote UE (under transition from indirect-to-direct Uu connection state) maybe connected to the network via Relay UE, has the SIB1 stored provided by the serving cell of the Relay UE, and receives the new SIB1 via the Uu interface. Alternatively, the UE (under transition from direct-to-indirect over PC5 of the Relay UE to the network) has the SIB1 stored provided directly from its serving cell via Uu interface, and receives the new SIB1 via the relay UE via the PC5 interface.

According to some example embodiments, the UE will then compare the contents (parameters) of the two SIBs (i.e., it compares contents of the stored SIB1 and the newly received SIB1), such as;

Cell ID, availability and scheduling of other SIBs, areascope or validity area related information, SI windows and/or method to obtain other SIBs (SIBx) indicated within the received SIB1

Based on this comparison, the remote UE may prefer one of the SIBs or a combination of parameters of the two SIBs (in case of inter-cell scenario; for intra-cell case, cell1=cell2, and the parameters are the same).

Following options maybe also taken into account in selecting whether the remote UE should select the SIB1 from cell-1 (Uu path) or cell-2 (PC5 path via relay UE):

If the Cell ID is different (inter-cell scenario): The remote UE will compare the SIB contents of the SIBs received via Relay UE and via Uu interface.

If 'key' SIB parameters or a set of the 'key' parameters (such as validity area, areaScope info. etc.) are the same, then the Remote UE may select to receive SI via any path, i.e. either via Uu interface or over PC5 interface via Relay UE. A key SIB parameter may be one of the following parameters or a combination of any of them (or any new SIB parameter added in future):

the associated areaScope, if present, the first PLMN-Identity in the PLMN-IdentityInfoList for non-NPN-only cells;

the first NPN identity (SNPN identity in case of SNPN, or PNI-NPN identity in case of PNI-NPN) in the NPN-IdentityInfoList for NPN-only cells, the cellIdentity, the systemInformationAreaID, if present; and the valueTag, if present, as indicated in the si-SchedulingInfo for the SIB. (Resource allocation/scheduling information)

According to current specifications:

if the UE stores the acquired posSIB, then the UE shall store the associated areaScope, if present, the cellIdentity, the systemInformationAreaID, if present, the valueTag, if provided in assistanceDataSIB-Element, and the expirationTime if provided in assistanceDataSIB-Element.

The UE may use a valid stored version of the SI except MIB, SIB1, SIB6, SIB7 or SIB8 e.g. after cell re-selection, upon return from out of coverage or after the reception of SI change indication. The valueTag and expirationTime for posSIB is optionally provided in assistanceDataSIB-Element, as specified in 3GPP TS 37.355

If the 'key' SIB parameters are different, the remote UE may prioritize a predefined path. For example, the remote UE may prefer the SI received via Relay UE over that received via Uu interface.

In a particular case, if the Cell ID's are different, then the UE may not compare the (remaining) contents of the SIBs received from different cells. It can simply prioritize one of the SIBs according to a predefined prioritization of the paths, e.g. the SIB received via the Relay UE over PC5 interface.

In another particular case, if the PLMN IDs of the received SIBs are different, the Remote UE may simply prioritize either SIB received via Relay UE over PC5 (preferred option) or the SIB received over Uu directly according to a predefined prioritization of the paths. In this case it is highly likely that the SIB contents are different since the PLMNs are different.

In another particular case, if the cell IDs are different and at least one or more IE(s) are different but are not relevant for the UE, then the UE may prioritize the SIB according to a predefined prioritization of the paths. E.g., it may prioritize the SIB received over Uu interface over that received over PC5 interface.

In another particular case, if the Cell IDs are different and one or more relevant IEs for the UE are different, then UE prioritize according to a predefined prioritization of the paths. E.g., it may prioritize SIB received over PC5 interface.

In some example embodiments, at least one of the SIBs may comprise an indication indicating to the UE to prioritize SIB from either of the paths via Uu interface or via PC5 interface. For example, the cell-2 may indicate via PC5 to the remote UE to use the SIB1 obtained via Uu interface, or cell-2 may indicate via PC5 interface to the remote UE to use the SIB1 obtained via PC5 interface. Such an indication may be caused e.g. due to the following circumstances:

An indication from Relay UE to Remote UE indicating "try to acquire SIBs over Uu", e.g. when the Relay or PC5 is heavily loaded. Relay UE may additionally provide this indication to the network (its serving gNB).

An indication from gNB (remote UE serving cell) via Uu interface to Remote UE that "asking—try to acquire SIBs over Uu" e.g. when the gNB knows that all (or a lot of) neighbouring cells advertise same SIBs. Alternatively, under this circumstance, serving cell may send indication over Uu interface to request "please acquire SIB1 from the Relay UE over PC5".

An indication from gNB via Uu interface to Remote UE "Do NOT try to acquire SIBs over Uu interface", e.g. when the gNB knows that all (or a lot of) the neighbouring cells advertise different SIBs. As another option, under this circumstance, serving cell may send indication over Uu interface to request "do NOT acquire SIB1 from the Relay UE over PC5 interface".

The predefined prioritizations for the different particular cases may be the same or different for each case.

If the Cell ID is Same (Intra-Cell Scenario):

The cell/gNB and/or PC5 Relay UE may decide and indicate which path to select for selecting the SIBs at the Remote UE. That is, Cell/gNB may indicate to Remote UE (via Uu interface) and/or to Relay UE (to forward the indication to the remote UE via PC5 interface), which path (via Uu interface or via PC5 interface) to prioritize. The indication can also be used to switch paths for receiving SIB (i.e. from Uu path to PC5 path and vice versa). The prioritization may be e.g. based on load on Uu interface and/or PC5 interface, load on relay UE, load on remote UE, link quality of Uu interface, link quality of PC5 interface etc.

On-demand indication may be used to switch the paths used to receive the SIB in both inter and intra cell cases.

In another embodiment, the Remote and Relay UE may coordinate to decide which SIBs to be used. In case the Remote UE makes the decision, it indicates this to the Relay UE and in case the Relay UE makes a decision, then the Relay UE may indicate to the Remote UE. To send indications, L1 (e.g. SCI), L2 (MAC CE etc.) and L3 signaling or a combination of L1/L2/L3 signalling may be used. The Remote/Relay UE may decide to couple or decouple the transmission of the indication with the ongoing unicast/groupcast/broadcast link. The deciding UE may also inform the network (the respective serving gNB) on the decision.

Figure 4:
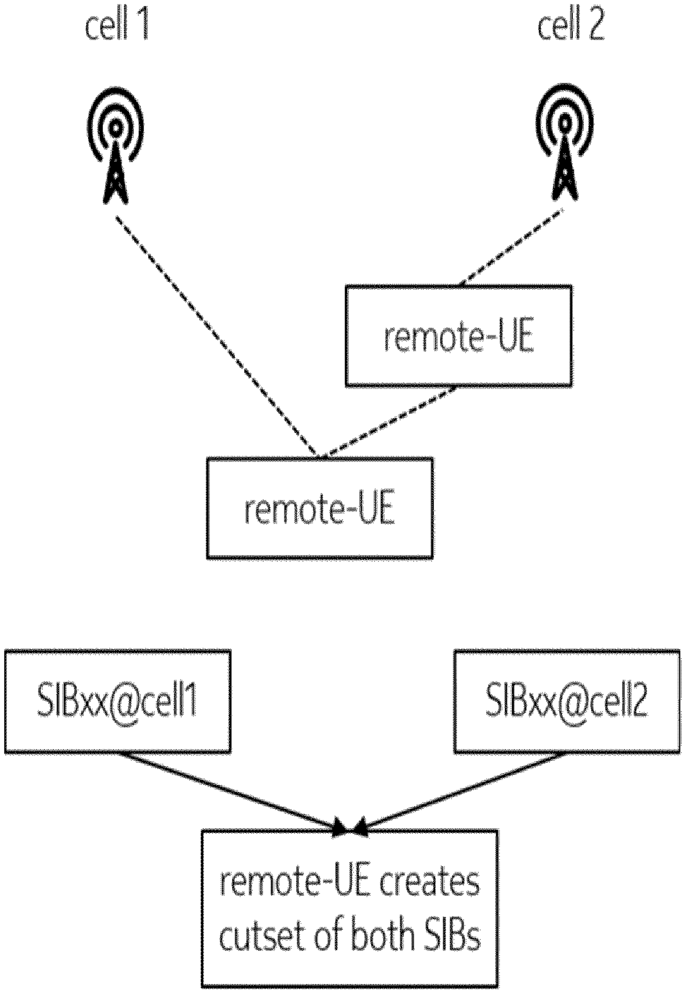
FIG. 4 shows a scenario of Solution 2 according to some example embodiments of the invention.

FIG. 4 provides an overview of the proposed UE behaviour when it receives SIB1 over 2 paths i.e. over Uu interface and over PC5 via the Relay UE. The received SIB1 can be from same or different cells. The SIB1 from different cells may have different parameters or contents such as availability and scheduling of other SIBs, SI windows and/or method to obtain subsequent SIBs indicated within the received SIB1, area/validity area info. Etc. and therefore the Remote-UE may prefer one or a combination of such parameters within SIB1 received from either cell-1 over Uu compared to the SIB1 received via Relay over PC5 from cell-2. Such options maybe also taken into account in selecting whether the remote-UE should select the SIBs (other than SIB1) from cell-1 or cell-2.

SIB1 is received via Uu from cell-1 and SIB1 is from cell-2 forwarded via the Relay UE over PC5.

If the Cell ID is same, the remote-UE may receive SIBs from both or one of the paths (i.e. Uu or PC5).

If the Cell ID is different: The remote UE will compare the SIB contents of the SIB received via Relay-UE and via Uu.

If 'key' SIB parameters (such as validity area) are same then the Remote UE may select to receive SIBs (other than SIB1) from either Uu and via PC5 based on based on parameters such as PC5 resource availability/utilization i.e. SL-CBR based on Uu link quality vs. PC5 link quality PC5/Uu load Or any other similar parameters

Figure 5:
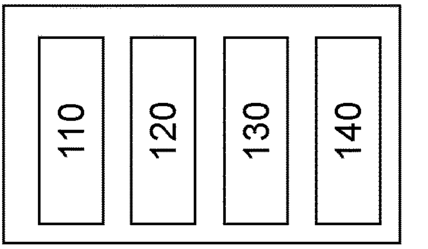
FIG. 5 shows an apparatus according to an example embodiment of the invention.

- If the 'key' SIB parameters (such as validity area) are different, the remote UE prioritize the SI received:
  - UE uses SI received over PC5 for Relay connection
  - UE uses SI received over Uu for direct Uu connection
- In another embodiment, the cell-1 or cell-2 may indicate the remote UE to prioritize either of the SIB1 (that would require inter-node message coordination since both cells need to coordinate which SIBs to prioritize). For example, the cell-2 may indicate via PC5 to the remote UE to use the SIB1 obtained via Uu and vice-versa. The cell 2 may indicate via PC5 to prioritize the SIB provided by itself (cell-2) over the cell-1 SIB provided over Uu and vice-versa.
- In another embodiment, a remote UE may receive contradictory indication from the 2 cells, intending to prioritize their respective SIBs. i.e. cell-2 may prioritize the remote UE to follow the SIB provided by cell-2 and cell-1 may prioritize the remote UE to follow the SIB provided by cell-1. In this case the remote UE may observe a contradiction and need to make a decision on which SIB it should follow. In this case, the remote UE may simply follow the latest SIB, i.e. SIB with latest time stamp, for example.
- The aforementioned prioritization indications to the remote UE can be introduced using new information elements in the SIB as depicted in FIG. 5. The new IEs in the SIB in Rel-17 marked as (SIBRelayPriority-r16, SIBRelayEnable-rxx) which the cells/gNB may configure and the remote UE may use select the appropriate SIB.

Another example embodiment of solution 1 is now described. Again, UE receives SIB1 over 2 paths (at the same time or in an arbitrary sequence): over Uu interface from cell 1 and over PC5 via the Relay UE from cell 2. The received SIB1s may be from a same cell or from different cells. If the SIB1s are from different cells they may have different parameters or contents such as availability and scheduling of other SIBs, SI windows and/or methods to obtain subsequent SIBs indicated within the received SIB1, area/validity area information etc., and therefore the Remote-UE may prefer one of the SIB1s or a combination of parameters (some parameters taken from SIB1 received from cell-1 over Uu interface and some parameters taken from SIB1 received via Relay over PC5 from cell-2). Such options may be also taken into account in selecting whether the remote-UE should select the SIBs (other than SIB1) from cell-1 or cell-2.

If the Cell IDs are the Same:

- the remote-UE may receive SIBs from both or one of the paths (i.e. Uu path or PC5 path). Conditions for a selection of the SIB are e.g.:
  - based on Uu link quality vs. PC5 link quality
  - based on parameters such as PC5 resource availability/utilization, i.e. SL-CBR
- In case remote-UE requires high reliability and/or both links (Uu and PC5) are weak the remote UE may obtain all SIBs from both connections (direct Uu and PC5 via relay-UE).

In the scenario of same cell Ids, acquiring SIB1 via Uu may save PC5 resources. On the other hand, considering latency issues selecting SIB1 received via Uu interface may be faster than via PC5 interface, unless Relay UE has a copy of SIB1.

If the Cell IDs are is Different:

The remote UE may compare the SIB contents of the SIBs received via Relay-UE and via Uu.

- If 'key' SIB parameters (such as validity area) are same, then the Remote UE may select to receive SIBxs (SIBs other than SIB1) from either Uu and via PC5 based on parameters such as PC5 resource availability/utilization, i.e. SL-CBR
  - Uu link quality vs. PC5 link quality
  - PC5 load
  - Uu load
  - Or any other similar parameters or a combination of such parameters
- If the 'key' SIB parameters (such as validity area) are different, the remote UE prioritize the SI received:
  - UE uses SI received over PC5 interface for Relay connection
  - UE uses SI received over Uu interface for direct Uu connection In some example embodiments, cell-1 or cell-2 may indicate to the remote UE to prioritize either of the SIB1s. Preferably, such a prioritization is coordinated between the cells (inter-node message coordination). For example, the cell-2 may indicate via PC5 interface to the remote UE to use the SIB1 obtained via Uu interface and vice-versa. The cell 2 may indicate via PC5 to prioritize the SIB provided by itself (cell-2) over the cell-1 SIB provided over Uu and vice-versa.

If a remote UE receives contradictory indications from the 2 cells (e.g. each of the cells prioritizes its respective SIBs, i.e. cell-2 prioritizes the remote UE to follow the SIB provided by cell-2, and cell-1 prioritizes the remote UE to follow the SIB provided by cell-1), the remote UE may observe the contradiction and may meet a decision on which SIB it should follow. For example, in this case, the remote UE may follow the latest SIB, i.e. SIB with latest time stamp, or it may follow the SIB received over one of the paths according to a predetermined prioritization, or it may ignore both prioritization indications and act as described above for a case without such prioritization indications. In some example embodiments, the remote UE may send a coordination request (trigger inter-cell coordination) to at least one of the cells (either cell-1 or cell-2 or both) and request to provide an appropriate SIB or recommendation which cell's SIB the remote UE should follow. In other words, the remote UE may initiate SIB conflict resolution procedure via inter-cell coordination.

Figure 3:
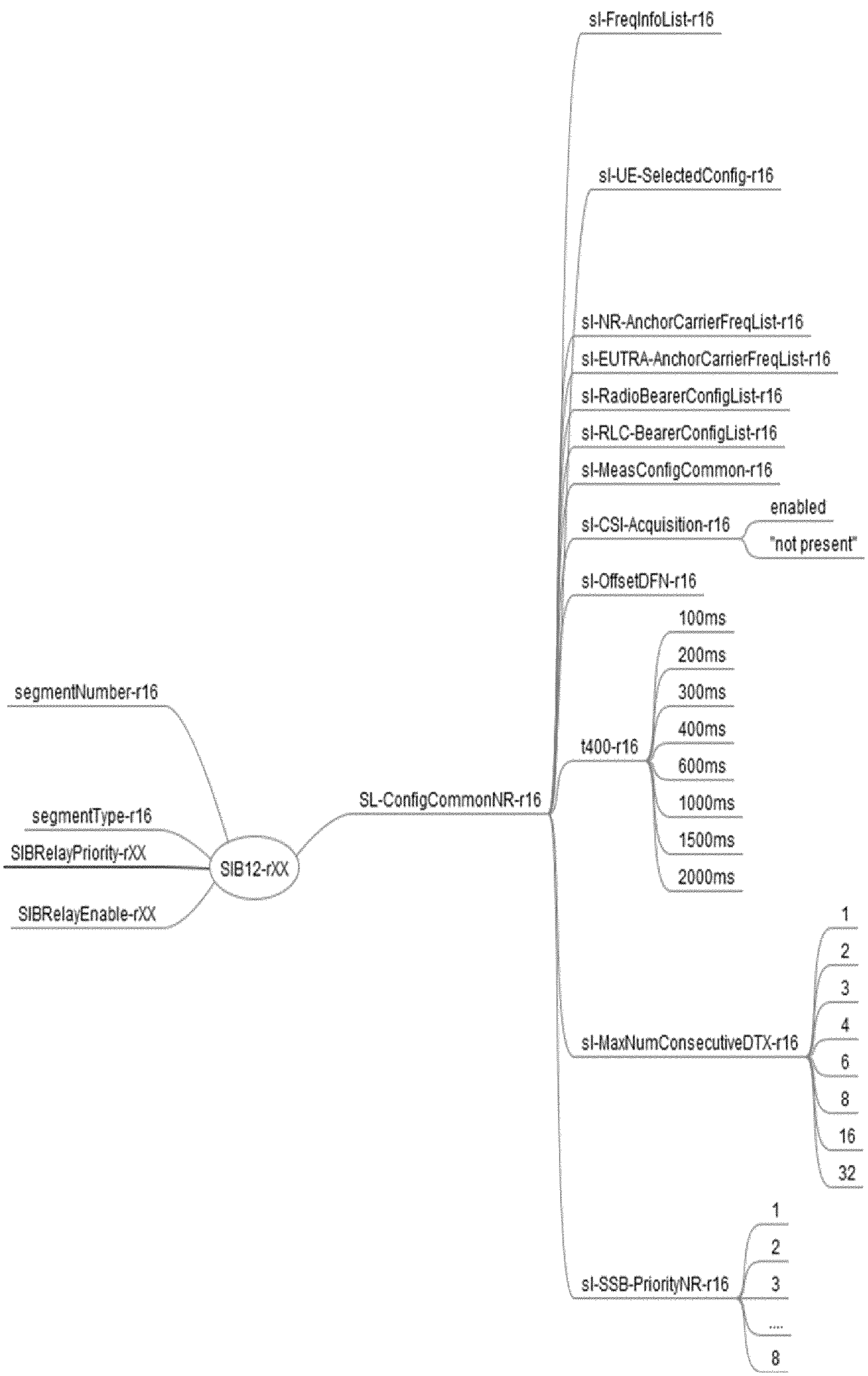
FIG. 3 shows information elements in SIB according to some example embodiments of the invention.

The aforementioned prioritization indications to the remote UE may use new information elements in the SIB as depicted in FIG. 3. The new IEs in the SIB in Rel-17 marked as (SIBRelayPriority-r16, SIBRelayEnable-rxx) which the cells/gNB may configure and the remote UE may select the appropriate SIB based on such prioritization indication. As another option, according to some example embodiments of the invention, the prioritization indication may be provided separately from SIB, as L1, L2 or L3 signalling or a combination thereof.

In some example embodiments, if the SIBs received from Relay over PC5 is not suitable for the remote UE (for e.g. in terms of QoS and PLMN ID or transfer of emergency service data), it may trigger relay re-selection. This may help e.g. if;

- the current relay connection has access restrictions for the remote UE's connection, in which case the new Uu cell may prove to provide non restricted operation. As of such, the remote UE may either be selecting the new cell, or even search for a relay UE within that cell for a better connection the new relay provides more advanced functions than the current relay connection, allowing for the remote UE to select a new cell, as described above.

Solution-2:

As shown in FIG. 4, according to some example embodiments of the invention, if a remote UE receives two separate SIBs from cell-1 over Uu interface and cell-2 over the PC5 interface via Relay UE, the remote UE may first decide if the cell IDs are different. If so, it may create a cut-set or custom SIB from the two SIBs or a sub-set SIB from one of the SIBs (i.e. Custom SIB message created by merging or deriving sub-set of Information Elements from SIB message (s) received via two different paths (Or from a single SIB received from one of the paths.), thereby forming a new custom SIB). For this cut-set SIB or sub-set SIB, the UE sort the most appropriate/suitable SIB IEs from the SIBs received from cell-1, cell-2 and derives a new SIB to follow.

In some example embodiments, the UE may derive the new SIB and propose it to the respective cells (cell-1, cell-2). The cells may optionally confirm the use of the new derived SIB or raise an objection if there is a conflict. In some example embodiments, in case one or both cells reject the new SIB, the remote UE may not follow the cut-set SIB or sub-set SIB but request a new on-demand SIB from the cells, or may request intercell coordination, as described above. In some other example embodiments, in case one or both cells accept the new SIB, the remote UE may follow the cut-set SIB or sub-set SIB.

Figure 6:
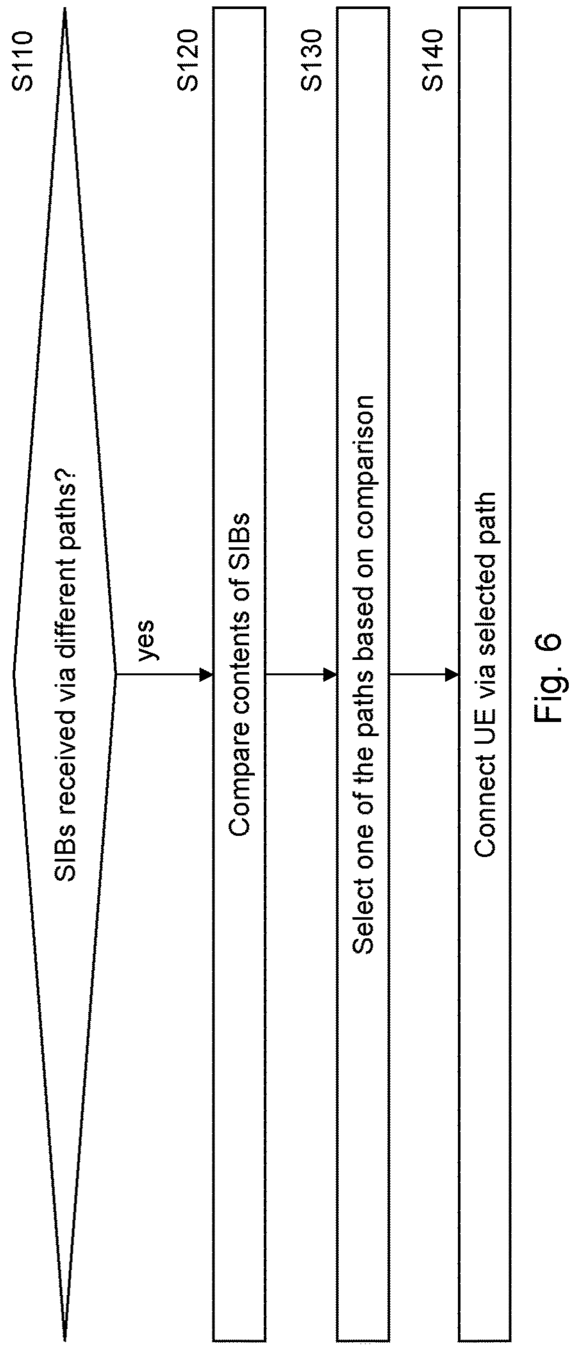
FIG. 6 shows a method according to an example embodiment of the invention.

FIG. 5 shows an apparatus according to an example embodiment of the invention. The apparatus may be a terminal, such as a UE In particular: a remote UE), or an element thereof. FIG. 6 shows a method according to an example embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises means for monitoring 110, means for comparing 120, means for selecting 130, and means for causing 140. The means for monitoring 110, means for comparing 120, means for selecting 130, and means for causing 140 may be a monitoring means, comparing means, selecting means, and causing means, respectively. The means for monitoring 110, means for comparing 120, means for selecting 130, and means for causing 140 may be a monitor, comparator, selector, and causer, respectively. The means for monitoring 110, means for comparing 120, means for selecting 130, and means for causing 140 may be a monitoring processor, comparing processor, selecting processor, and causing processor, respectively.

The means for monitoring 110 monitors if a remote terminal receives a first SIB from a first cell via a first path and a second SIB from a second cell via a second path different from the first path (S110). The first SIB and the second SIB may be received in an arbitrary sequence or fully or partly in parallel.

If the remote terminal receives the first SIB and the second SIB (S110=yes), the means for comparing 120 compares a content of the first SIB with a content of the second SIB (S120). Based on a result of the comparing in S120, the means for selecting 130 selects one of the first path and the second path (S130). The means for causing 140 causes the remote terminal to connect via the one of the first path and the second path selected in S130 (S140).

Figure 8:
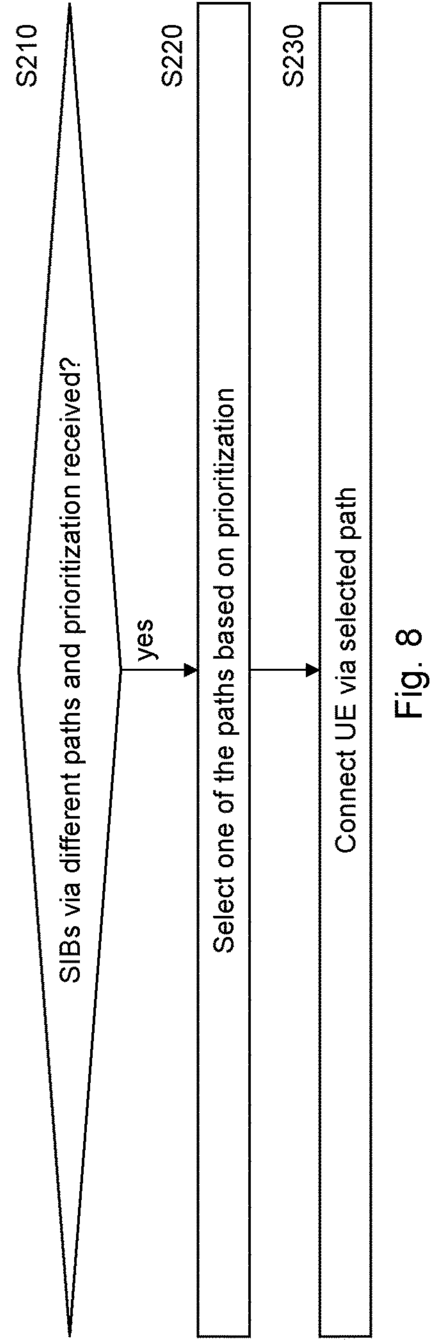
FIG. 8 shows a method according to an example embodiment of the invention.
Figure 7:
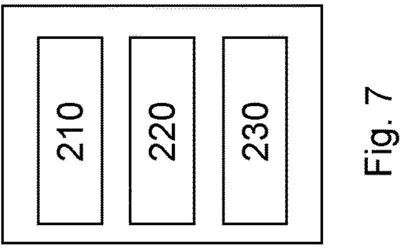
FIG. 7 shows an apparatus according to an example embodiment of the invention.

FIG. 7 shows an apparatus according to an example embodiment of the invention. The apparatus may be a terminal, such as a UE In particular: a remote UE), or an element thereof. FIG. 8 shows a method according to an example embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises means for monitoring 210, means for selecting 220, and means for causing 230. The means for monitoring 210, means for selecting 220, and means for causing 230 may be a monitoring means, selecting means, and causing means, respectively. The means for monitoring 210, means for selecting 220, and means for causing 230 may be a monitor, selector, and causer, respectively. The means for monitoring 210, means for selecting 220, and means for causing 230 may be a monitoring processor, selecting processor, and causing processor, respectively.

The means for monitoring 210 monitors if a remote terminal receives a first SIB via a first path, a second SIB via a second path, and a prioritization decision between the first path and the second path (S210). The second path is different from the first path. The prioritization decision indicates which of the first path and the second path is prioritized over the other of these paths. The first SIB, the second SIB, and the prioritization decision may be received in an arbitrary sequence or fully or partly in parallel.

If the remote terminal receives the first SIB, the second SIB and the prioritization decision (S210=yes), the means for selecting 220 selects one of the first path and the second path based on the prioritization decision (S220). The means for causing 230 causes the remote terminal to connect via the one of the first path and the second path selected in S220 (S230).

Figure 10:
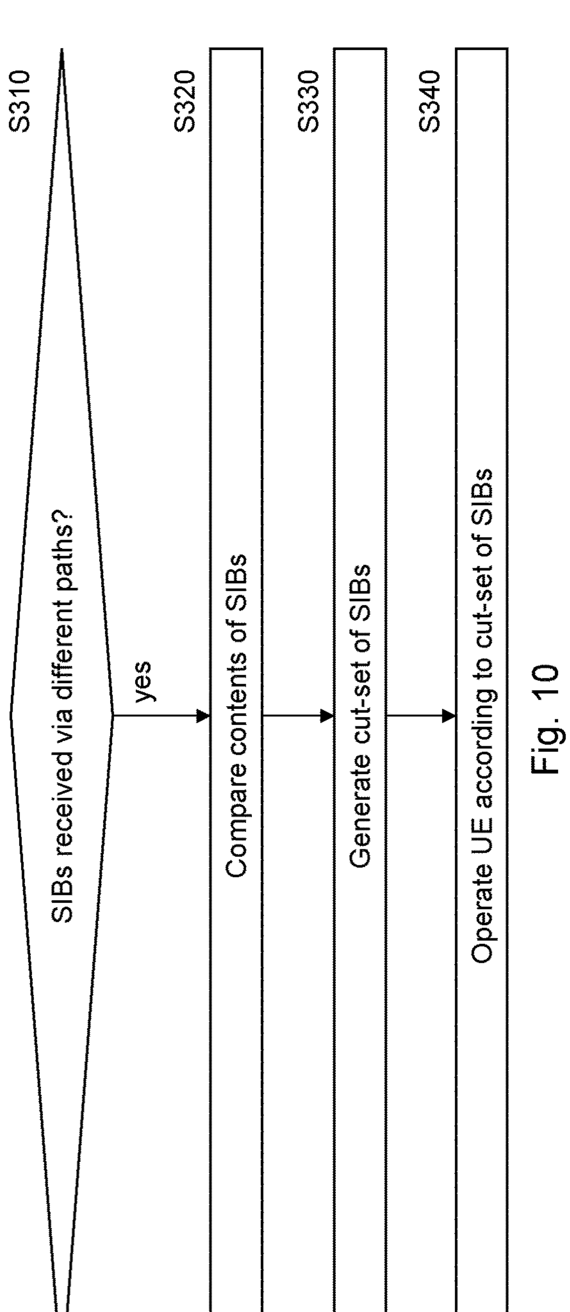
FIG. 10 shows a method according to an example embodiment of the invention.
Figure 9:
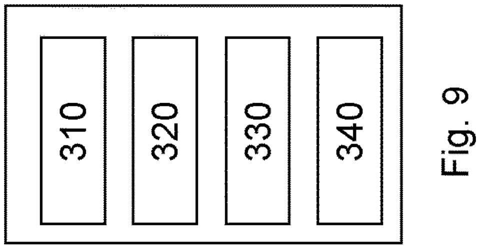
FIG. 9 shows an apparatus according to an example embodiment of the invention.

FIG. 9 shows an apparatus according to an example embodiment of the invention. The apparatus may be a terminal, such as a UE In particular: a remote UE), or an element thereof. FIG. 10 shows a method according to an example embodiment of the invention. The apparatus according to FIG. 9 may perform the method of FIG. 10 but is not limited to this method. The method of FIG. 9 may be performed by the apparatus of FIG. 10 but is not limited to being performed by this apparatus.

The apparatus comprises means for monitoring 310, means for comparing 320, means for generating 330, and means for causing 340. The means for monitoring 310, means for comparing 320, means for generating 330, and means for causing 340 may be a monitoring means, comparing means, generating means, and causing means, respectively. The means for monitoring 310, means for comparing 320, means for generating 330, and means for causing 340 may be a monitor, comparator, generator, and causer, respectively. The means for monitoring 310, means for comparing 320, means for generating 330, and means for causing 340 may be a monitoring processor, comparing processor, generating processor, and causing processor, respectively.

The means for monitoring 310 monitors if a remote terminal receives a first SIB via a first path from a first cell and a second SIB via a second path from a second cell (S310). The second path is different from the first path. The first SIB and the second SIB may be received in an arbitrary sequence or fully or partly in parallel.

If the remote terminal receives the first SIB and the second SIB (S310=yes), the means for comparing 320 compares a content of the first SIB with a content of the second SIB (S320). The means for generating 330 generates a third SIB as a cut-set of the first SIB and the second SIB (S330). The means for causing 340 causes the remote terminal to connect via one of the first path and the second path and to operate according to the third SIB, i.e., the cut-set SIB (S340).

Figures 11, 12:
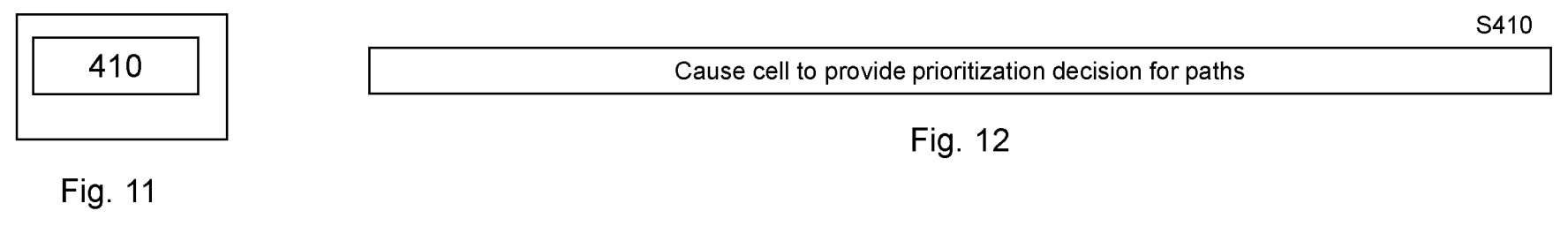

FIG. 11 shows an apparatus according to an example embodiment of the invention. The apparatus may be a cell (represented by a base station such as a gNB or eNB), or an element thereof. FIG. 12 shows a method according to an example embodiment of the invention. The apparatus according to FIG. 11 may perform the method of FIG. 12 but is not limited to this method. The method of FIG. 12 may be performed by the apparatus of FIG. 11 but is not limited to being performed by this apparatus.

The apparatus comprises means for causing 410. The means for causing 410 may be a causing means. The means for causing 410 may be a causer. The means for causing 410 may be a causing processor.

The means for causing 410 causes a first cell to provide a prioritization decision for a selection between a first path and a second path by a remote terminal (S410). The first path is from the first cell to the remote terminal. The second path is from a second cell to the remote terminal. The second path is different from the first path. The prioritization decision indicates which of the first path and the second path is prioritized for the selection by the remote terminal.

FIG. 13 shows an apparatus according to an example embodiment of the invention. The apparatus may be a cell (represented by a base station such as a gNB or eNB), or an element thereof. FIG. 14 shows a method according to an example embodiment of the invention. The apparatus according to FIG. 13 may perform the method of FIG. 14 but is not limited to this method. The method of FIG. 14 may be performed by the apparatus of FIG. 13 but is not limited to being performed by this apparatus.

The apparatus comprises means for monitoring 510, means for checking 520, and means for causing 530. The means for monitoring 510, means for checking 520, and means for causing 530 may be a monitoring means, checking means, and causing means, respectively. The means for monitoring 510, means for checking 520, and means for causing 530 may be a monitor, checker, and causer, respectively. The means for monitoring 510, means for checking 520, and means for causing 530 may be a monitoring processor, checking processor, and causing processor, respectively.

The means for monitoring 510 monitors if a cell receives an information of a cut-set SIB from a remote terminal (S510). A content of the cut-set SIB is a subset of the content of a SIB transmitted by the cell.

If the cell receives the information (S510=yes), the means for checking 520 checks whether or not it is acceptable for the cell that the remote terminal operates based on the cut-set SIB (S520).

If it is not acceptable for the cell that the remote terminal operates based on the cut-set SIB (S520=no), the means for causing 530 causes the cell to provide, to the remote terminal, an objection to the cut-set SIB (S530).

FIG. 15 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 6, 8, 10, 12, and 14 and related description.

Some example embodiments of the invention are explained for a case that a first path is directly from a first cell to the remote UE (via Uu interface) and the second path is from a second cell via a relay UE (via PC5 interface). However, the invention is not limited to this case. It is applicable to any case where the remote UE receives SIBs via different paths. For example, UE may receive SIBs from a first cell via a first relay UE (first path via a first PC5 interface) and from a second cell via a second relay UE different from the first relay UE (second path via a second PC5 interface).

The number of different paths over which SIBs are received is not limited to 2. There may be 3 or more different paths.

In some example embodiments, the contents of SIB messages are compared when the contents of SIBs are compared.

Some example embodiments are explained with respect to a 5G network (NR). However, the invention is not limited to 5G. It may be used in other networks, too, e.g. in forthcoming generations of 3GPP networks such as 6G, 7G, etc. Accordingly, the SIB1 is not limited to its definition for 5G.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a terminal, such as a UE, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a cell, represented by a base station (e.g. gNB, eNB), or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus comprising:

one or more processors, and memory storing instructions that, when executed by the one or more processors, cause the apparatus to perform:

monitoring that a remote terminal receives a first system information block from a first cell via a first path and a second system information block from a second cell via a second path different from the first path;

comparing a content of the first system information block with a content of the second system information block because the remote terminal receives the first system information block and the second system information block;

determining, based on both the first system information block and the second system information block comprising a respective prioritization indication, that the prioritization indications are contradictory;

requesting the first cell and the second cell to jointly agree on a prioritization of the first path and the second path;

receiving an indication of the jointly agreed prioritization in response to the requesting;

selecting one of the first path or the second path based on a result of the comparing, wherein the one of the first path or the second path is selected based on the indication of the jointly agreed prioritization; and causing the remote terminal to connect via the selected one of the first path or the second path.

2. The apparatus according to claim 1, wherein at least one of: the first path is directly from the first cell to the remote terminal; or the second path is from the second cell via one or more first relay terminals to the remote terminal.

3. The apparatus according to claim 1, wherein the comparing comprises comparing, for the first system information block and the second system information block, at least one of: an identity of a mobile communication network indicated in the respective system information block; an identity of a cell indicated in the respective system information block; a validity area of the respective system information block indicated in the respective system information block; an availability of one or more further system information blocks via the respective path, as indicated in the respective system information block; or a method to obtain at least one of the one or more further system information blocks via the respective path, as indicated in the respective system information block.

4. The apparatus according to claim 2, wherein the instructions, when executed by the one or more processors, further cause the apparatus to perform: deciding that the content of the second system information block is not acceptable for the remote terminal; creating a third path and removing the second path because the content of the second system information block is not acceptable for the remote terminal; replacing the second system information block by a third system information block received via the third path; wherein the third path is from a third cell via one or more second relay terminals to the remote terminal; and at least one of the one or more second relay terminals is different from each of the one or more first relay terminals.

5. A method comprising:

monitoring that a remote terminal receives a first system information block from a first cell via a first path and a second system information block from a second cell via a second path different from the first path;

comparing a content of the first system information block with a content of the second system information block because the remote terminal receives the first system information block and the second system information block;

determining, because both the first system information block and the second system information block comprising a respective prioritization indication, the prioritization indications are contradictory;

requesting the first cell and the second cell to jointly agree on a prioritization of the first path and the second path;

receiving an indication of the jointly agreed prioritization in response to the requesting;

selecting one of the first path or the second path based on a result of the comparing, wherein the one of the first path or the second path is selected based on the indication of the jointly agreed prioritization; and causing the remote terminal to connect via the selected one of the first path or the second path.

6. The method according to claim 5, wherein at least one of: the first path is directly from the first cell to the remote terminal; or the second path is from the second cell via one or more first relay terminals to the remote terminal.

7. The method according to claim 5, wherein the comparing comprises comparing, for the first system information block and the second system information block, at least one of: an identity of a mobile communication network indicated in the respective system information block; an identity of a cell indicated in the respective system information block; a validity area of the respective system information block indicated in the respective system information block; an availability of one or more further system information blocks via the respective path, as indicated in the respective system information block; or a method to obtain at least one of the one or more further system information blocks via the respective path, as indicated in the respective system information block.

8. The method according to claim 6, further comprising: deciding that the content of the second system information block is not acceptable for the remote terminal; creating a third path and removing the second path because the content of the second system information block is not acceptable for the remote terminal; replacing the second system information block by a third system information block received via the third path; wherein the third path is from a third cell via one or more second relay terminals to the remote terminal; and at least one of the one or more second relay terminals is different from each of the one or more first relay terminals.

* * * * *